No. 800,271. PATENTED SEPT. 26, 1905.
E. A. COWLES.
CHUCK.
APPLICATION FILED NOV. 25, 1904.
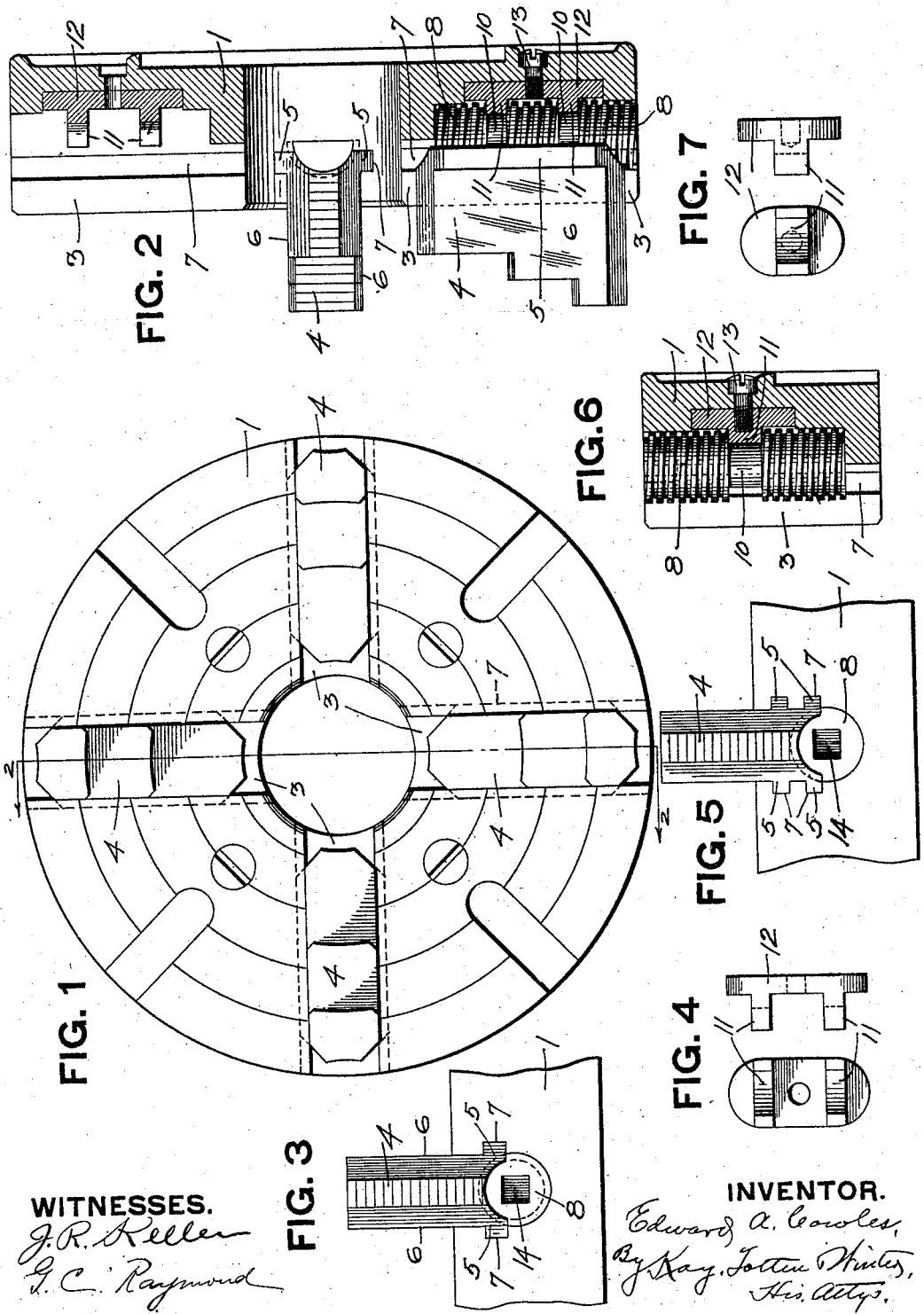

UNITED STATES PATENT OFFICE.

EDWARD A. COWLES, OF WILKINSBURG, PENNSYLVANIA.

CHUCK.

No. 800,271.  Specification of Letters Patent.  Patented Sept. 26, 1905.

Application filed November 25, 1904. Serial No. 234,211.

*To all whom it may concern:*

Be it known that I, EDWARD A. COWLES, a resident of Wilkinsburg, in the county of Allegheny and State of Pennsylvania, have invented a new and useful Improvement in Chucks; and I do hereby declare the following to be a full, clear, and exact description thereof.

My invention relates to chucks such as are used on lathes, boring-mills, drilling-machines, milling-machines, and the like, and more especially to chucks having independently-adjustable jaws.

The object of my invention is to improve chucks of the character specified in details of construction so as to secure greater strength of the jaw, greater ease of adjusting the same, a stronger grip on the work, and simple retaining means for the adjusting-screws.

To these ends the invention consists in details of construction hereinafter described and claimed.

In the accompanying drawings, Figure 1 is a face view of one form of chuck constructed according to my invention. Fig. 2 is a vertical section through the same on the line 2 2, Fig. 1. Fig. 3 is an edge view looking at the end of one of the jaws. Fig. 4 is a detail view of the screw-retaining plate. Fig. 5 is a view similar to Fig. 3, showing a modified form of jaw. Fig. 6 is a sectional detail showing a modified form of screw and screw-retainer, and Fig. 7 is a detail view of the screw-retainer of this modification.

My invention is shown applied to a lathe-chuck having four radial jaws; but this form and number of jaws have been selected for purposes of illustration largely, as obviously the principle can be applied to many different forms of chucks.

In the drawings the body of the chuck is shown at 1, and when used as a lathe-chuck said body will be provided with a central opening and with a series of radial ways 3 for receiving the chuck-jaws 4. The form of the body and the gripping-faces of the jaws may be varied within wide limits and to suit individual conditions or tastes. The jaws shown are of the reversible character, having gripping-faces on both ends. With prior chuck constructions the jaws have had grooves cut in their side faces, and the sides of the ways of the body have been provided with tongues which project into said grooves. Such construction is objectionable for several reasons, first, because it weakens the jaw—that is, reduces its width by the depths of the grooves cut into the two side faces thereof, and, second, the projecting ribs on the sides of the ways narrow said ways, and therefore limit the size of the jaw-adjusting screws which can be dropped down into the ways. As a consequence, with the prior constructions the jaws have been structurally weak and the actuating-screws have been of small diameter. One feature of my invention applies to the shape of the jaws and sides of the ways in which they move. Instead of cutting grooves in the side faces of the jaws I provide the same with tongues or ribs 5, which project beyond the flat side faces 6 thereof. The sides of the ways 3 in which the jaws move instead of being provided with tongues, as heretofore, are provided with grooves 7 for receiving the tongues 5 of the jaws. The bottom faces of the jaws are threaded and are engaged by adjusting-screws 8. By reason of the construction just described the jaws are not weakened, but are of the maximum strength of the metal of the entire width thereof and are much stronger than prior jaws having grooves cut into their side faces. Furthermore, the ways are not narrowed by inwardly-projecting tongues, and as a consequence the screws 8 can be much larger than in prior chucks and substantially of the width of the ways. This results in several important advantages—viz., the angle of the thread necessarily is less than that of a small screw of same pitch and as a consequence the adjustment of the jaws can be much more easily effected than with a small screw, and the grip or pressure of the jaws on the work is much greater than with a small screw.

In the form shown in Fig. 3 the chuck-jaw is provided on each side with a single rib 5. For very heavy work the number of such ribs can be increased. For instance, in Fig. 5 each side of the jaw is provided with two such ribs.

Another feature of my invention consists in improved means for retaining the adjusting-screws in place. This consists of bearing-plates separate from the body of the chuck itself, so that they can be easily and cheaply machined and fitted and can be made of steel and hardened. These retaining-plates are arranged to be inserted into the ways from the front face of the chuck, so that it is not necessary to cut through the body of the chuck and weaken the same. To secure this end, I provide the adjusting-screws 8 with a neck or necks 10 intermediate their ends, thus securing the greatest range of adjustment of the jaws. The bearing or seat 11 for such neck or necks I form on a plate 12, which is independent of the body and rests in a suitable recess formed at the bottom of the ways in which the jaws move. These plates can be held in place by means of a screw 13 or the like. The adjusting-screws may be provided with a single neck or journal 10, as shown in Fig. 6, or with a plurality thereof, as shown in Fig. 2, and the retaining-plates 12 will have a corresponding number of bearings. By making these retaining-plates separate from the chuck-body they can be easily and cheaply machined and fitted and can be made of steel, and either the entire plate, or at least the bearings thereof, can be hardened so as to reduce the wear due to the end thrust of the screws.

The screws of my chuck project out flush with the outer face of the body thereof, as shown in Fig. 2, and the actuating means therefor consists of a polygonal socket 14 for receiving a wrench or key. In this manner the effective length of the screw extends out to the outer edge of the chuck-body, yet no portion of the screw projects beyond the body, so as to be in the way and catch the clothing of the workmen or cause other damage.

By reason of the details of construction described the chuck can be very cheaply manufactured. The chuck-jaws are exceedingly strong and the actuating-screws are of the maximum permissible diameter, thus insuring ease of adjustment and greater binding or clamping power in the jaws. The screws extend entirely out to the edge of the chuck-body, thus increasing the range of adjustment of the jaws, and said screws are retained by means of seats, preferably made of steel and hardened, which are separate from the body and inserted into the ways from the front face of the chuck.

What I claim is—

1. In a chuck, the combination of a body having ways formed therein and provided with grooves in the side faces of said ways, screws seated in said ways and being of a diameter substantially equal to the width of the ways, and jaws movable in the ways and provided with tongues or ribs projecting beyond their side faces and engaging the grooves of the ways and having threaded bottom faces which are engaged by said screws.

2. In a chuck, the combination of a body provided with a way having a solid bottom, a jaw mounted in said way and provided with a threaded bottom face, a screw mounted in the bottom of said way and engaging said jaw, and a screw-retaining plate insertible through the front of said way and mounted on the bottom thereof and having a bearing for engaging a neck or necks of the screw.

3. In a chuck, the combination of a body provided with a way having a solid bottom, a jaw mounted in said way and provided with a threaded bottom face, a screw seated in the bottom of the way and engaging said jaw, said screw being provided with a neck or necks intermediate its ends, and a screw-retaining plate insertible through the front of the way and mounted on the bottom thereof and having a bearing for engaging the neck or necks of the screw.

In testimony whereof I, the said EDWARD A. COWLES, have hereunto set my hand.

EDWARD A. COWLES.

Witnesses:
G. H. RANKIN,
F. W. WINTER.